United States Patent
Binyamini et al.

(10) Patent No.: US 11,907,724 B2
(45) Date of Patent: Feb. 20, 2024

(54) IN-MEMORY TRACE WITH OVERLAPPING PROCESSING AND LOGOUT

(71) Applicant: International Business Machines Corporation, Armonk, NY (US)

(72) Inventors: Lior Binyamini, Holon (IL); Chung-Lung K. Shum, Wappingers Falls, NY (US); Ludmila Zernakov, Netanya (IL); Markus Kaltenbach, Tübingen (DE); Jang-Soo Lee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 17/592,686

(22) Filed: Feb. 4, 2022

(65) Prior Publication Data

US 2023/0251864 A1   Aug. 10, 2023

(51) Int. Cl.
G06F 9/44 (2018.01)
G06F 9/38 (2018.01)
G06F 11/34 (2006.01)

(52) U.S. Cl.
CPC ........ G06F 9/3867 (2013.01); G06F 11/3466 (2013.01)

(58) Field of Classification Search
CPC .................. G06F 9/3867; G06F 11/3466
See application file for complete search history.

(56) References Cited

U.S. PATENT DOCUMENTS

| 6,087,967 A * | 7/2000 | Budnik ............... G06F 30/33 716/136 |
| 7,975,182 B2 | 7/2011 | St. Onge et al. |
| 10,824,426 B2 | 11/2020 | Bartik et al. |
| 2008/0126828 A1* | 5/2008 | Girouard ........... G06F 11/3644 714/E11.178 |
| 2008/0141002 A1* | 6/2008 | Bhargava .......... G06F 11/3476 712/220 |
| 2016/0147653 A1 | 5/2016 | Accapadi et al. |
| 2018/0288132 A1 | 10/2018 | Wilding et al. |

(Continued)

FOREIGN PATENT DOCUMENTS

| CN | 108369553 A | 8/2018 |
| CN | 109313606 A | 2/2019 |
| CN | 110651250 A | 1/2020 |

OTHER PUBLICATIONS

International Search Report; dated Apr. 23, 2023; Application No. PCT/IB2023/050160; filed: Jan. 9, 2023; 6 pages.

*Primary Examiner* — Hang Pan
(74) *Attorney, Agent, or Firm* — Cantor Colburn LLP; Nathan Rau

(57) ABSTRACT

A computer-implemented method includes assigning a first group of one or more units of an instruction pipeline of a processor as a frontend group and assigning a second group of the one or more units of the instruction pipeline of the processor as a backend group. A frontend logout is performed to transfer one or more trace records from the first group to a trace controller during an in-memory trace of an instruction. A backend logout is performed to transfer one or more trace records from the second group to the trace controller during the in-memory trace of the instruction. A next instruction is started in the first group of the instruction pipeline before the backend logout completes.

17 Claims, 6 Drawing Sheets

(56) References Cited

U.S. PATENT DOCUMENTS

| | | |
|---|---|---|
| 2018/0341480 A1 | 11/2018 | Bartik et al. |
| 2018/0341481 A1* | 11/2018 | Bartik ..................... G06F 11/36 |
| 2019/0188068 A1 | 6/2019 | Mane et al. |
| 2019/0235864 A1 | 8/2019 | Bartik et al. |
| 2022/0413870 A1* | 12/2022 | Thamarassery Mekkat ................ G06F 9/382 |

* cited by examiner

IN-MEMORY TRACE WITH OVERLAPPING PROCESSING AND LOGOUT

BACKGROUND

The present invention generally relates to computer technology and, more specifically, to in-memory trace with overlapping processing and logout.

In-memory trace (IMT) is a mechanism to allow a processor in a running system to collect instruction-based traces with information required for offline performance analysis. Performance traces generated from IMT are used to drive performance modeling and analysis to gain insights on continuously evolving software (e.g., application, operating systems) running on a targeted system. The insights can provide an understanding into hardware and firmware design tradeoffs with respect to existing or new workloads, such as artificial intelligence (AI), cloud, and data analytics. Verification test cases can also be generated from IMT for hardware pre-silicon simulation to predict and validate performance of processors in development. IMT typically operates in an extended slow mode state on one or more processors of a targeted system. In some instances, software being executed can potentially behave differently if the processing speed of the underlying processor is drastically reduced as compared to normal processing speed. This may result in invalid or inaccurate trace results.

IMT can produce a large number of IMT data records, where multiple units within a processor collect IMT data records as each instruction passes through its instruction processing pipeline. Waiting until instruction completion before transferring IMT data records and waiting until the transfer of IMT data is completed before starting another instruction in the pipeline can ensure that the IMT data records maintain coherency on a per instruction basis. However, such serialized processing of collecting and transferring of IMT data records can drastically reduce processing throughput when running in such an extended slow mode state. In some instances, relatively small timing margins may exist where a processing throughput reduction reaches a level that alters the behavior of an executing program.

SUMMARY

According to one or more embodiments of the present invention, a computer-implemented method includes assigning a first group of one or more units of an instruction pipeline of a processor as a frontend group and assigning a second group of the one or more units of the instruction pipeline of the processor as a backend group. A frontend logout is performed to transfer one or more trace records generated from the first group to a trace controller during an in-memory trace of an instruction. A backend logout is performed to transfer one or more trace records generated from the second group to the trace controller during the in-memory trace of the instruction. A next instruction is started in the first group of the instruction pipeline before the backend logout completes. Advantages can include providing a method to partially overlap trace record transfers with respect to time generated from both the first group and the second group to reduce the total trace record transfer time.

In accordance with additional or alternative embodiments of the present invention, the next instruction can be blocked from starting in the first group of the instruction pipeline until after the frontend logout completes, and/or the next instruction can be blocked from starting in the second group of the instruction pipeline until after the backend logout completes for the instruction. Advantages can include preventing the next instruction from starting before the frontend and/or backend logout completes.

In accordance with additional or alternative embodiments of the present invention, generation of one or more new trace records by at least one of the one or more units of the instruction pipeline can be suppressed based on the trace controller sending a new trace record inhibit signal to the one or more units. Advantages can include targeting one or more units of the instruction pipeline to prevent new trace records for the next instruction from interfering with trace records of a current instruction.

In accordance with additional or alternative embodiments of the present invention, suppressing generation of the one or more new trace records can be performed to prevent the next instruction from generating one or more new trace records in the first group until after the backend logout completes for the instruction. Advantages can include preventing new trace records for the next instruction from interfering with trace records of a current instruction.

In accordance with additional or alternative embodiments of the present invention, an operating mode of the processor can be determined based on the instruction being processed, and overlapped logout processing of the frontend group and the backend group can be enabled or disabled. Advantages can include selectively controlling when overlapped logout processing is performed.

In accordance with additional or alternative embodiments of the present invention, the frontend logout can be skipped based on determining the one or more trace records from the first group contain no new values, and the backend logout can be skipped based on determining the one or more trace records from the second group contain no new values. Advantages can include accelerating logout when no new values are present.

In accordance with additional or alternative embodiments of the present invention, a subsequent instruction can be fetched and dispatched after the next instruction based on completion of the frontend logout of the next instruction and determining that the one or more trace records from the second group are empty. Advantages can include accelerating logout when trace records are empty.

According to another aspect, a system of a processor includes an instruction pipeline including a plurality of units and a trace controller. The trace controller includes circuitry to perform operations including assigning a first group of one or more units of the instruction pipeline of the processor as a frontend group and assigning a second group of the one or more units of the instruction pipeline of the processor as a backend group. The trace controller is further operable to perform operations including performing a frontend logout to transfer one or more trace records from the first group to a trace controller during an in-memory trace of an instruction after the first group completes processing. The trace controller is further operable to perform operations including performing a backend logout to transfer one or more trace records from the second group to the trace controller during the in-memory trace of the instruction and starting a next instruction in the first group of the instruction pipeline before the backend logout completes. Advantages can include providing a system to partially overlap trace record transfers with respect to time generated from both the first group and the second group to reduce the total trace record transfer time.

According to another aspect, a computer program product includes a computer readable storage medium having program instructions embodied therewith. The program instructions are executable by circuitry of a processor to cause the processor to perform operations including assigning a first group of one or more units of an instruction pipeline of the processor as a frontend group and assigning a second group of the one or more units of the instruction pipeline of the processor as a backend group. The program instructions are executable by the circuitry of the processor to cause the processor to perform operations including performing a frontend logout to transfer one or more trace records from the first group to a trace controller during an in-memory trace of an instruction. The program instructions are executable by the circuitry of the processor to cause the processor to perform operations including performing a backend logout to transfer one or more trace records from the second group to the trace controller during the in-memory trace of the instruction and starting a next instruction in the first group of the instruction pipeline before the backend logout completes. Advantages can include providing a computer program product to partially overlap trace record transfers with respect to time generated from both the first group and the second group to reduce the total trace record transfer time.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
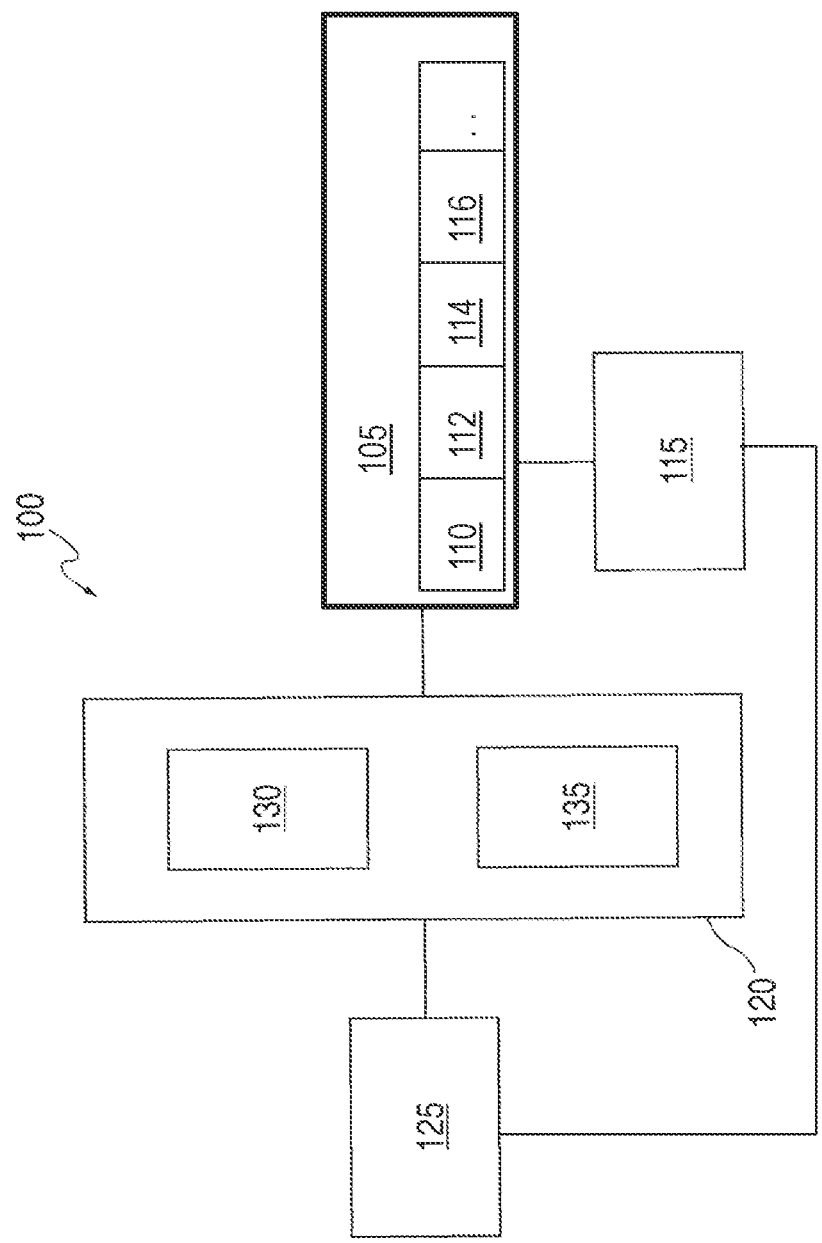
FIG. 1 depicts a system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted, or modified. Also, the term "coupled", and variations thereof describe having a communications path between two elements and do not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a data processing system, such as computer server, captures in-memory trace (IMT) data that includes an instruction trace collected by hardware while instructions flow through an execution pipeline (also referred to as an instruction pipeline or processing pipeline). For example, data processing systems, such as IBM® Z systems processors, can include a function of capturing hardware generated instruction traces as IMT data. Capturing the IMT data have addressed and resolved the technical challenges of conventional tracing methodology using, for instance, a Console Monitoring System (CMS) Adjunct Tracing System (CATS) by enabling capture of traces with millicode instructions for complex workloads.

Technical solutions are described herein to improve IMT speed in a processor. Embodiments of the present invention address technical challenges that are rooted in computing technology, particularly in IMT, where if the observed processor speed during IMT is relatively too slow versus during non-IMT, the targeted software may behave drastically different, resulting in invalid IMT data. Embodiments of the present invention address technical challenges described herein by providing overlaps of generation and logout processing of IMT data from groups of units of an instruction pipeline of a processor. The system, as further described herein, can reduce IMT overhead as seen by software, by speeding up the total time for transferring the contents of trace arrays during IMT operations spanning a sequence of multiple instructions.

In current designs, a processor core running in IMT mode executes a single instruction at a time, typically in a form of slow mode state, with each unit in the processing pipeline storing pre-determined IMT data into one or more local trace arrays (i.e., a write phase of IMT). After an instruction completes, the trace controller reads the IMT records from these local trace array records and send them into an on-chip memory interface (i.e., a logout phase of IMT) to be written into a pre-allocated memory buffer set up through software and firmware. After the records for the current instruction are all sent, a next instruction can begin through the pipeline.

Running software can potentially behave differently if the processing speed of the underlying processor is drastically reduced as compared to normal processing speed. Since IMT runs in an extended slow mode state, there is a need to keep IMT mode performing at a "fast-enough" slow mode such that software being captured will not change from its typical behavior. Otherwise, the traces collected will be invalid, or unusable for offline analysis. Embodiments of the present invention facilitate faster logout of IMT records, which can in turn support faster data collection, reduce the collection overhead, and allow for IMT tracing to be performed at a rate that maintains desired software behavior.

Turning to the drawings, FIG. 1 depicts a system 100 as an example of a computer system. The system 100 includes a central processor or central processing unit (CPU) 105, also referred to as processor 105. The processor 105 may include any suitable components, such as an instruction fetch unit (IFU) 110, and may be coupled in communication with a memory subsystem 115.

The IFU 110 is employed to fetch, decode and dispatch instructions on behalf of the processor 105 from memory subsystem 115. The IFU 110 either fetches "next sequential instructions", target instructions of branch taken instructions, or first instructions of a program following a context switch. In one or more examples, IFU 110 employs prefetch techniques to speculatively prefetch instructions based on the likelihood that the prefetched instructions might be used. For example, the IFU 110 can fetch 16 bytes of instructions that include the next sequential instruction and additional bytes of further sequential instructions. The fetched instructions are decoded to determine the nature of these instructions and then dispatched.

In one or more examples, the dispatched instruction(s) are passed to an instruction sequencing unit ISU 112. The ISU 112 forwards information about the decoded instruction(s) when issuing instructions to appropriate units of the processor 105. In some examples, the instruction sequencing unit 112 supports out of order execution of instructions by maintaining register renames, instruction dependencies while adhering to program order. The instruction unit determines which instructions are ready to be issued. Issued instructions are then executed by the processor 105 in the corresponding units in the back end.

For example, the processor 105 includes an execution unit 116 that receives information about issued arithmetic instructions from the ISU 112 and performs arithmetic operations on operands according to the opcode of the instruction. Operands of such instructions are provided to the execution unit 116 from memory subsystem 115, architected registers of the processor 105, and/or from an immediate field of the instruction being executed. Results of the execution, when stored, are stored either in memory subsystem 115, architected registers, and/or in other machine hardware (such as control registers, status registers and the like).

As another example, the processor 105 also includes a load/store unit (LSU) 114. The LSU 114 is a special kind of execution unit that accesses data operand in memory subsystem 115. The LSU 114 can perform a memory load operation by obtaining the address of the target operand and loading the content at the corresponding memory location into a register or another memory location. The LSU 114 can perform a store operation by obtaining the address of the target operand and storing data obtained from a register or another memory location into the target operand location in memory. In one or more examples, the LSU 114 can be speculative and may access memory in a sequence that is out-of-order relative to program order; however, the LSU 114 maintains the appearance of overall data consistency as seen by the programs.

In an example where processor 105 is an out of order superscalar processor, the ISU 112 communicates with components of the processor 105, such as IFU 110, LSU unit 114, execution unit 116, registers, cache/memory interface or other elements of the processor 105, including various register circuits and other arithmetic logic units (ALUs), to provide pipeline sequencing to keep operations in-order. While instructions may be executed out of order, but the ISU 112, together with other units in processor 105, provides functionality to make the out of order operations appear to the program as having been performed in order.

The system 100 can include multiple levels of caches or other such structures that provide a source of instructions and data with lower latencies from memory subsystem 115 in addition to (or in place of) the direct connection between processor 105 and memory subsystem 115. For instance, the system 100 can include a first-level cache 120 and a second-level cache 125 that supports the first-level cache 120. The second-level cache 125 will work with memory subsystem 115 in retrieving and updating contents in memory. In one embodiment, the first-level cache 120 includes an instruction cache (I-cache) 130 and a data cache (D-cache) 135. Other caching structures or topologies can be deployed in system 100, not illustrated, by those skilled in the art, but should not affect the present invention.

Figure 2:
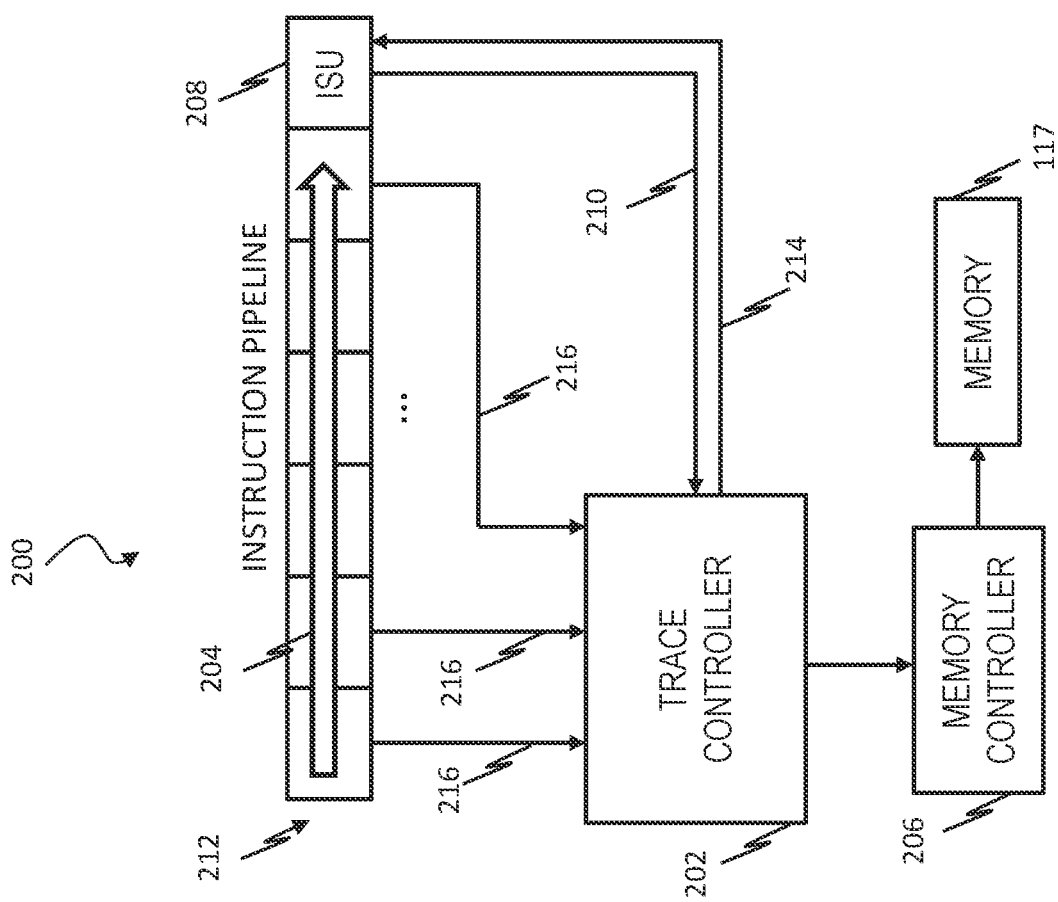
FIG. 2 depicts a portion of the system of FIG. 1 according to one or more embodiments of the present invention.

FIG. 2 depicts a block diagram of a portion 200 of the system 100 of FIG. 1 according to one or more embodiments of the present invention. The portion 200 of the system 100 can include components of the processor 105 and memory subsystem 115 of FIG. 1. To support trace operations for IMT, a trace controller 202 can interface with an instruction pipeline 204 of the processor 105 and a memory controller 206 that interfaces with a memory 117. When processing in IMT mode, which is an extended slow mode state for the processor, only one instruction is processed at a time in the processor pipeline. An instruction unit (ISU) 208 (also referred to as ISU 112 previously) of the instruction pipeline 204 can signal the beginning of instruction fetching to kick off the IMT processing through a start signal 210 sent to the trace controller 202. As the single instruction flows through the instruction pipeline 204 that includes a plurality of same or different units 212, each unit 212 can write pre-determined data record into one or more trace array buffers as required for IMT (i.e., the write-phase).

Once execution of the single instruction is completed (also determined by ISU 208), a logout of the IMT data 216 written by the units 212 can be started (i.e., the logout phase). The trace controller 202 controls the logout phase. For example, the trace controller 202 can request that the units 212 (e.g., instruction fetch, decode, issue, execution, load/store, etc.) send the IMT data 216 from the trace array buffers to the trace controller 202. In some examples, the IMT data 216 can be of byte-wide size to minimize wiring overhead on chip, and IMT records from units may require many IMT data 216 transfers to complete a full logout.

Once the trace controller 202 receives the IMT data 216 from the units 212, the trace controller 202 can store the IMT data 216 into a local data buffer using banks of registers (e.g., 32-bit registers) and then send the IMT data directly to the memory controller 206, which may be an on-chip memory controller of the processor 105 of FIG. 1. The local data buffer allows the trace controller 202 to balance the WIT data 216 read bandwidth against the output bandwidth towards the memory controller 206. The memory controller 206 can further buffer the data before writing the collected data in a pre-determined bandwidth to an area of the memory 117 that has been already set aside by firmware during IMT activation. The trace controller 202 can continue to gather IMT data 216 from units 212 through its local data buffer until all information collected in the trace arrays is sent to the memory controller 206. Once all the IMT data 216 are sent, the trace controller 202 can signal the ISU 208 to start the next instruction (by initiating the next instruction fetching) through an IMT done signal 214.

In some IMT designs, there is no distinction between the relative position of the units 212 in the instruction pipeline 204 with regard to the order of which the IMT data 216 are logged out. Typically, the IMT data 216 for all of the units 212 in the instruction pipeline 204 are read after completion of an instruction through all of the units 212. This can result in an instruction processing slow down that can affect software behavior, where the IMT data 216 are read out serially, one unit at a time from multiple trace arrays with data collected that are typically made up with several multi-byte records per trace array. Embodiments can reduce the number of logout cycles needed to complete IMT logout without missing any required IMT records, avoiding potential software behavior changes.

Figure 3:
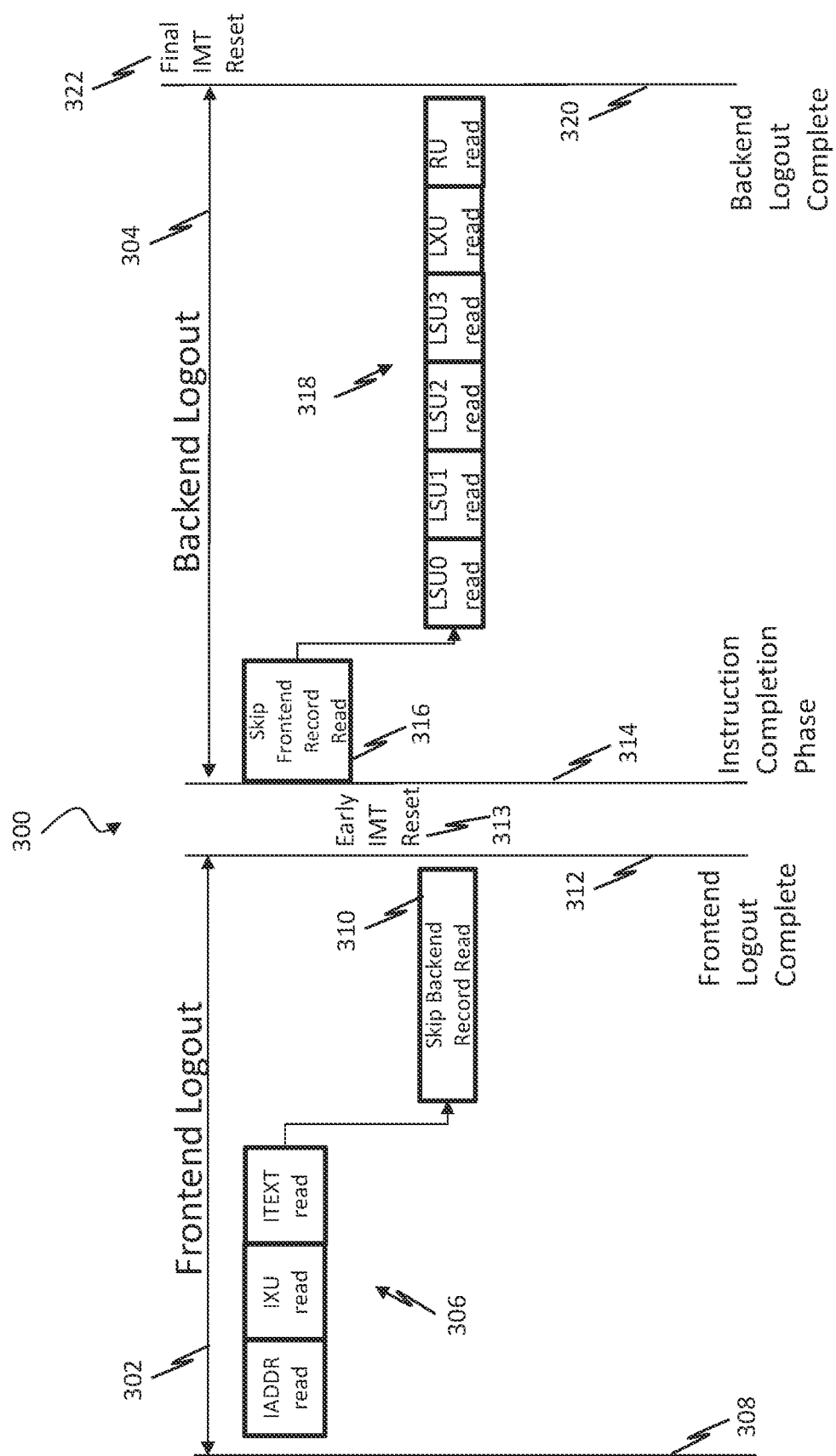
FIG. 3 depicts an example of logout processing for in-memory trace according to one or more embodiments of the present invention.

FIG. 3 depicts an example of logout processing 300 for IMT according to one or more embodiments. The logout processing 300 can be performed by the trace controller 202 of FIG. 2 with respect to instruction pipeline 204 of FIG. 2. Embodiments can partition the IMT logout into two or more groups, such as a frontend logout 302 and a backend logout 304. For example, frontend records 306 that can be related to instruction fetching and instruction decoding (inside IFU 110) can logout earlier, such as right after the decoded instruction is dispatched into ISU 112/208 and during the execution phase of the pipeline during IMT. As further example, the backend records 318 can be related to data operand accesses (by LSU 114) and information from arithmetic operations (by execution unit 116). The frontend logout 302 can start 308 after logout completes for a previous instruction in a sequence of instructions. Although the example of FIG. 3 depicts a logout partitioned into two groups as frontend logout 302 and backend logout 304, logout can be further partitioned into additional groups, e.g., three or more.

In the example of FIG. 3, the frontend logout 302 can transfer frontend records 306, for instance, after instruction dispatch by reading out of IFU 110 the instruction address (IADDR) and instruction text (ITEXT) records 306. If the instruction access requires address translation, one or more translation (IXU) records 306 will also be read. In one embodiment, the frontend logout 302 can use the state machine of a full logout by skipping 310 backend record read out once the frontend records are read, and the logout completes 312 with sending all frontend records to the memory controller 206. The backend logout 304 can start after an instruction completion phase 314. For example, the backend records 318 can include operand access (LSU #) records, and instruction completion unit (RU) records, and the like. If the operand accesses require address translation, one or more translation (LXU) records 306 will also be read. In one embodiment, the backend logout 304 can use the state machine of a full logout by skipping the frontend record read out 316 and jumps directly to read backend records 318. If the instruction completes during the frontend logout 302, the trace controller 202 of FIG. 2 can complete the frontend logout 302 and then immediately initiate the backend logout 304. An early IMT reset 313 can occur between the frontend logout 302 and the backend logout 304. After the backend logout completes 320, a final IMT reset 322 can occur. Trace arrays used to capture IMT records for the frontend logout 302 can be reset for further tracing of the next instruction (in a sequence of instructions) after the early IMT reset 313, likely before the backend logout completes 320. Trace arrays used to capture IMT records for the backend logout 304 can be reset for further tracing of the next instruction (in a sequence of instructions) after the final IMT reset 322, likely before the frontend logout completes 312.

The partitioning of an IMT trace logout into groups can be selectively used by the trace controller 202 of FIG. 2 under various conditions. For instance, when the processor 105 of FIG. 1 is running in a "slow mode", IMT record generation and logout and can be performed while an instruction is still being processed by segregating the instruction pipeline 204 of the processor 105 and the corresponding IMT records into multiple groups. Once a first group of units 212 is done with its instruction processing, e.g., instruction fetching, caching, and decoding, and IMT record writes, the trace controller 202 can start logging out frontend records 306 generated by the units 212 of the first group and prevent a next instruction from starting up while IMT data 216 of the first group (e.g., frontend records 306) are still logging out to avoid conflicts.

For the backend logout 304, once a second group is done with its instruction processing, e.g., issue, arithmetic operations, and operand accesses, the trace controller 202 can start logging out the backend records 318 generated by the units 212 of the second group. The trace controller 202 can also prevent a next instruction from starting up the units 212 of the second group by blocking instruction entry into the corresponding processor pipeline stage, e.g., by blocking dispatch, while IMT data 216 of the second group (e.g., backend records 318) are still being logged out.

The trace controller 202 can also handle multiple instruction types and suppress the overlap of instruction processing and IMT logout where there is a dependency or potential conflict between the first group and the second group of the same instruction, or a dependency or potential conflict between the second group and the first group of the next instruction. In one example, the address translation records (IXU and LXU) can be written to the same trace array for physical reasons, and the trace controller 202 can decide to suppress the overlap if IXU records were written in the first group. By suppressing, the potential of LXU records that can be generated in the second group while the IXU records are being read for logout, leading to a potential read/write conflict at the shared trace array, can be prevented. Various types of instructions can trigger the trace controller 202 to suppress overlap processing that blocks starting a next instruction in the frontend of the instruction pipeline 204 until after backend processing completes. For instance, a complex instruction type or diagnostic instruction type, e.g., detected during instruction decode, can suppress the splitting of the IMT logout processing into multiple groups.

In some embodiments, the trace controller 202 can avoid potential dependencies or conflicts without having to suppress overlap processing. Using the example of shared address translation records between first and second group, the trace controller 202 can temporarily suppress generation of one or more new IXU trace records in the second group until after the backend logout completes 320 for the instruction. Suppressing generation of one or more new trace records can be performed based on the trace controller 202 sending a new trace record inhibit signal to one or more units 212 of the instruction pipeline 204 to prevent the corresponding unit from generating one or more new trace records until after the potentially conflicting logout completes that may otherwise create new trace records for instruction N+1, and upon logout completion, the trace controller 202 can stop sending the inhibit signal to allow new trace record creation to proceed. For instance, the trace controller 202 can send an inhibit signal to the IFU 110 to suppress any IXU records from generation to prevent a trace array read/write overlap from occurring if the backend has already written LXU records. In some embodiments, the translation IMT records are only created during a TLB (translation lookaside buffer) or a cache miss, inhibition may not occur frequently. In some embodiments, when an IMT record is inhibited from generation, the corresponding unit will hold up the instruction processing, and the instruction will be paused from moving forward in the processor pipeline.

Figure 4:
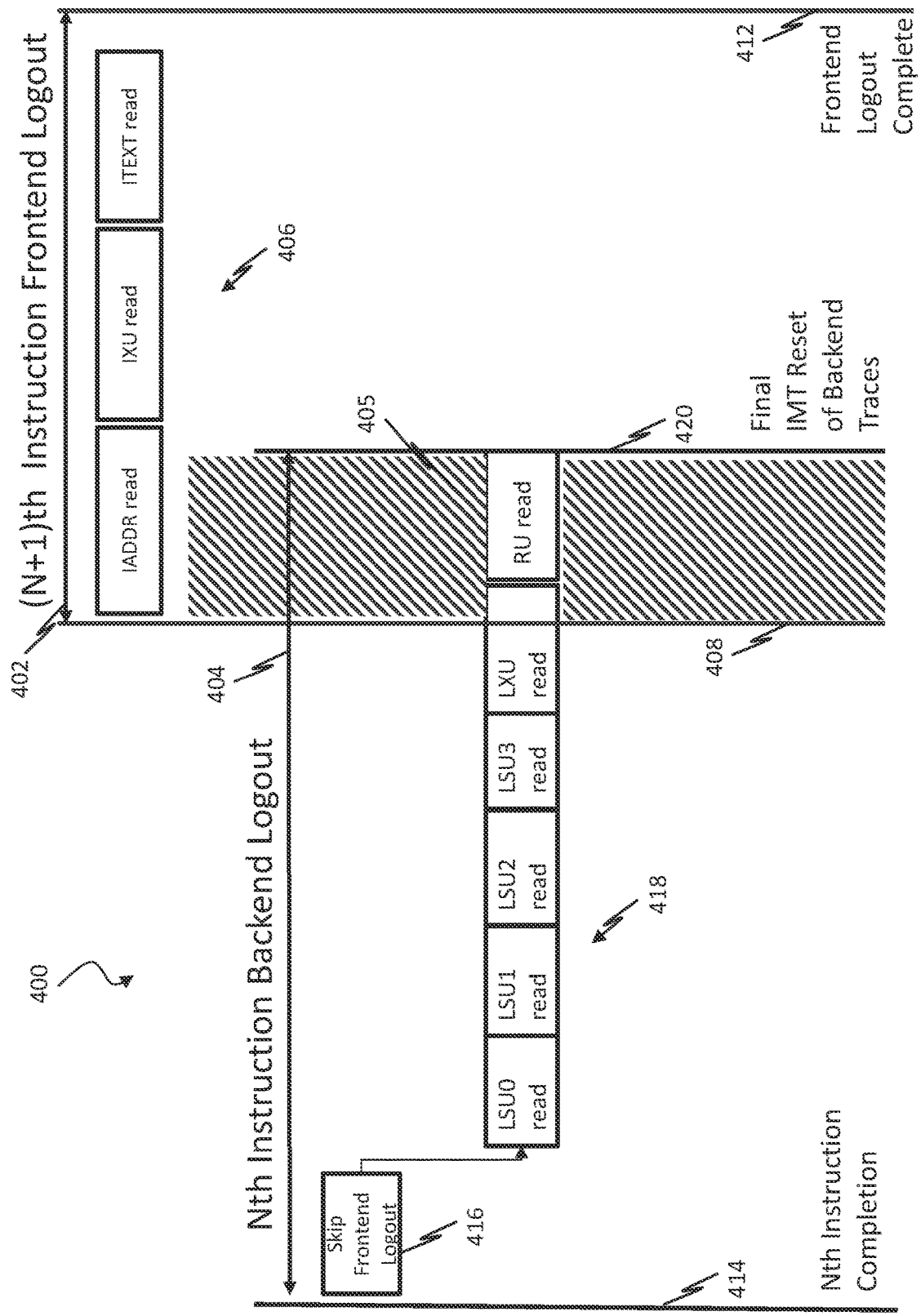
FIG. 4 depicts an example of logout processing between an instruction and a next instruction according to one or more embodiments of the present invention.

FIG. 4 depicts an example of logout processing 400 between an instruction and a next instruction according to one or more embodiments. The logout processing 400 illustrates a frontend logout 402 of a next ((N+1)th) instruction overlapping 405 in time with a backend logout 404 of an (Nth) instruction. During the backend logout 404 of the Nth instruction, upon Nth instruction completion 414, the backend logout 404 can skip 416 the frontend record read out to read backend records 418. The frontend logout 402 of the next (N+1)th instruction can start 408, after the frontend logout of the Nth instruction completes, before the backend logout completes 420 with a final IMT reset of the backend traces associated with the Nth instruction. The frontend logout 402 can proceed with transferring frontend records 406 until the frontend logout completes 412 for the next (N+1)th instruction. This early start 408 of performing the frontend logout 402 on the next (N+1)th instruction is illustrated schematically by the overlapping 405 region of time and results in a time savings as compared to waiting to perform all logout operations serially between a sequence of instructions. The time savings of the overlapping 405 region is depicted as an example and can be established based on various processing timing constraints.

Figure 5:
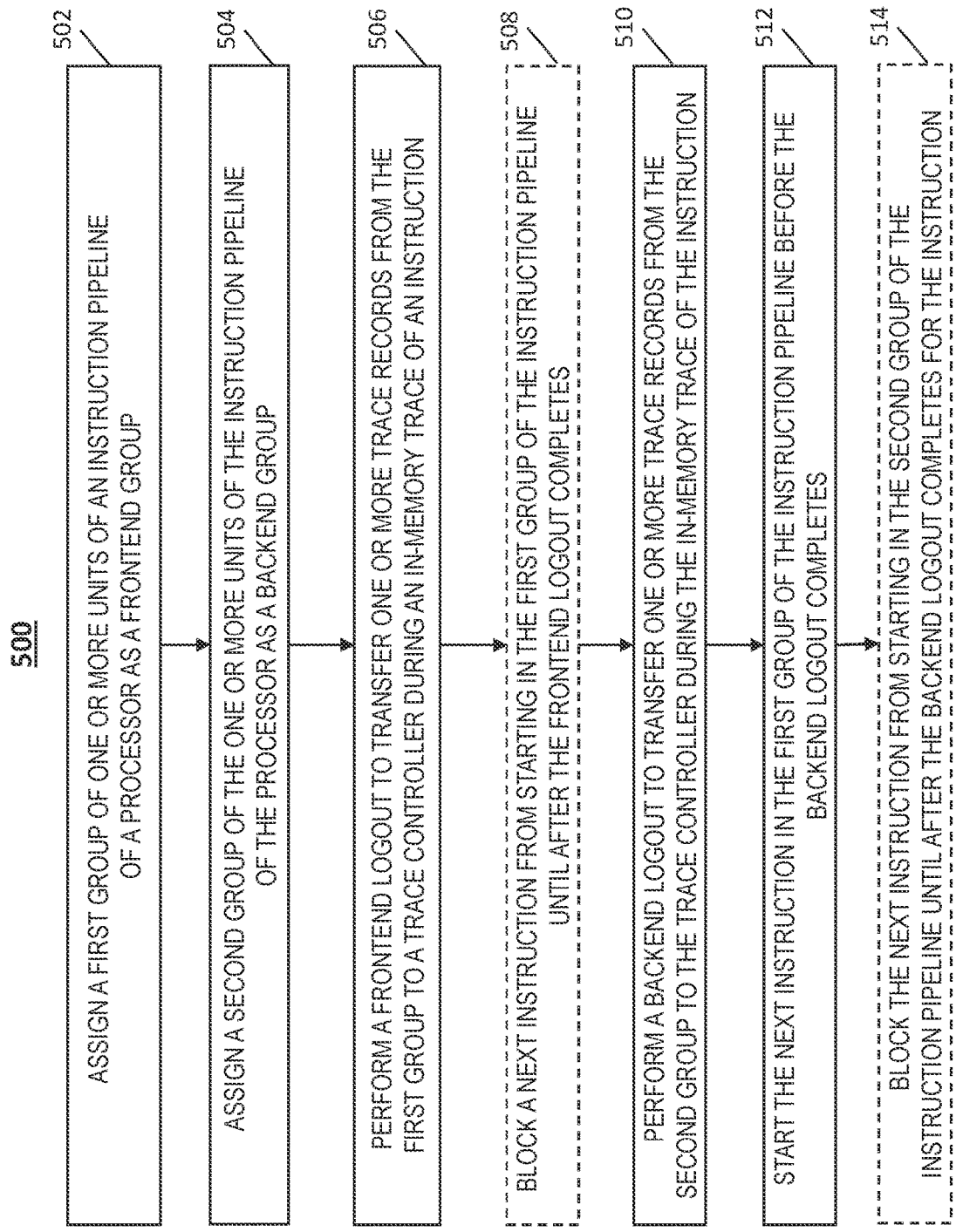
FIG. 5 depicts a flowchart of a method according to one or more embodiments of the present invention.

FIG. 5 depicts a flowchart of a method 500 for in-memory trace logout processing according to one or more embodiments of the present invention. The method 500 is described with respect to FIGS. 1-5. Although the method 500 is depicted in a particular order, it will be understood that some steps may be performed in a different order and may be combined or further divided into additional steps. The method 500 that is depicted in FIG. 5 can be implemented in one or more processors of a computer system, such as the system 100 of FIG. 1 and/or a computer system as further described herein in reference to FIG. 6.

At block 502, the trace controller 202 can assign a first group of one or more units 212 of an instruction pipeline 204 of a processor 105 as a frontend group. At block 504, the trace controller 202 can assign a second group of the one or more units 212 of the instruction pipeline 204 of the processor 105 as a backend group.

At block 506, the trace controller 202 can perform a frontend logout 302 to transfer one or more trace records (e.g., frontend records 306) from the first group to the trace controller 202 during an IMT of an instruction after the first group completes processing. At block 508, in some embodiments, the trace controller 202 can block (i.e., prevent) a next instruction from starting in the first group of the instruction pipeline 204 until after the frontend logout completes 312.

At block 510, the trace controller 202 can perform a backend logout 304 to transfer one or more trace records (e.g., backend records 318) from the second group to the trace controller 202 during the IMT of the instruction after the second group completes processing. At block 512, the trace controller 202 can start the next instruction in the first group of the instruction pipeline 204 before the backend logout completes 320. At block 514, in some embodiments, the trace controller 202 can block the next instruction from starting in the second group of the instruction pipeline 204 until after the backend logout completes 320 for the instruction.

In some embodiments, the trace controller 202 can suppress generation of one or more new trace records by at least one of the one or more units 212 of the instruction pipeline 204 based on the trace controller 202 sending a new trace record inhibit signal to the one or more units 212. Suppressing generation of the one or more new trace records can be performed to prevent the next instruction from generating one or more new trace records in the first group until after the backend logout completes for the instruction. In some embodiments, suppressing generation of one or more new trace records can be performed based on the trace controller 202 sending a new trace record inhibit signal to at least one of the one or more units 212 of the instruction pipeline 204 to prevent the next instruction from generating one or more new trace records in the first group until after the backend logout completes 320 for the instruction.

In the case when an instruction is not fully completed, e.g., encountering an instruction access exception in the frontend, or encountering an operand access exception in the backend, the trace controller 202 will be notified by the ISU 208, and potentially logout partial records and insert a special exception record into the trace.

The trace controller 202 can determine an operating mode of the processor 105 and enable or disable separate processing of the frontend group and the backend group during the IMT based on determining that the instruction being processed in the pipeline can incur potential conflicts with the logout mechanism. The speed of IMT processing can be further increased through various actions, for example, the frontend logout 302 can be skipped based on determining that the one or more trace records (e.g., frontend records 306) from the first group contain no new values and/or the backend logout 304 can be skipped based on determining that the one or more trace records (e.g., backend records 318) from the second group contain no new values. As another example, fetching and dispatching of a subsequent instruction can be performed after the next instruction based on completion of the frontend logout 302 of the next instruction and determining that the one or more trace records (e.g., backend records 318) from the second group are empty.

Figure 6:
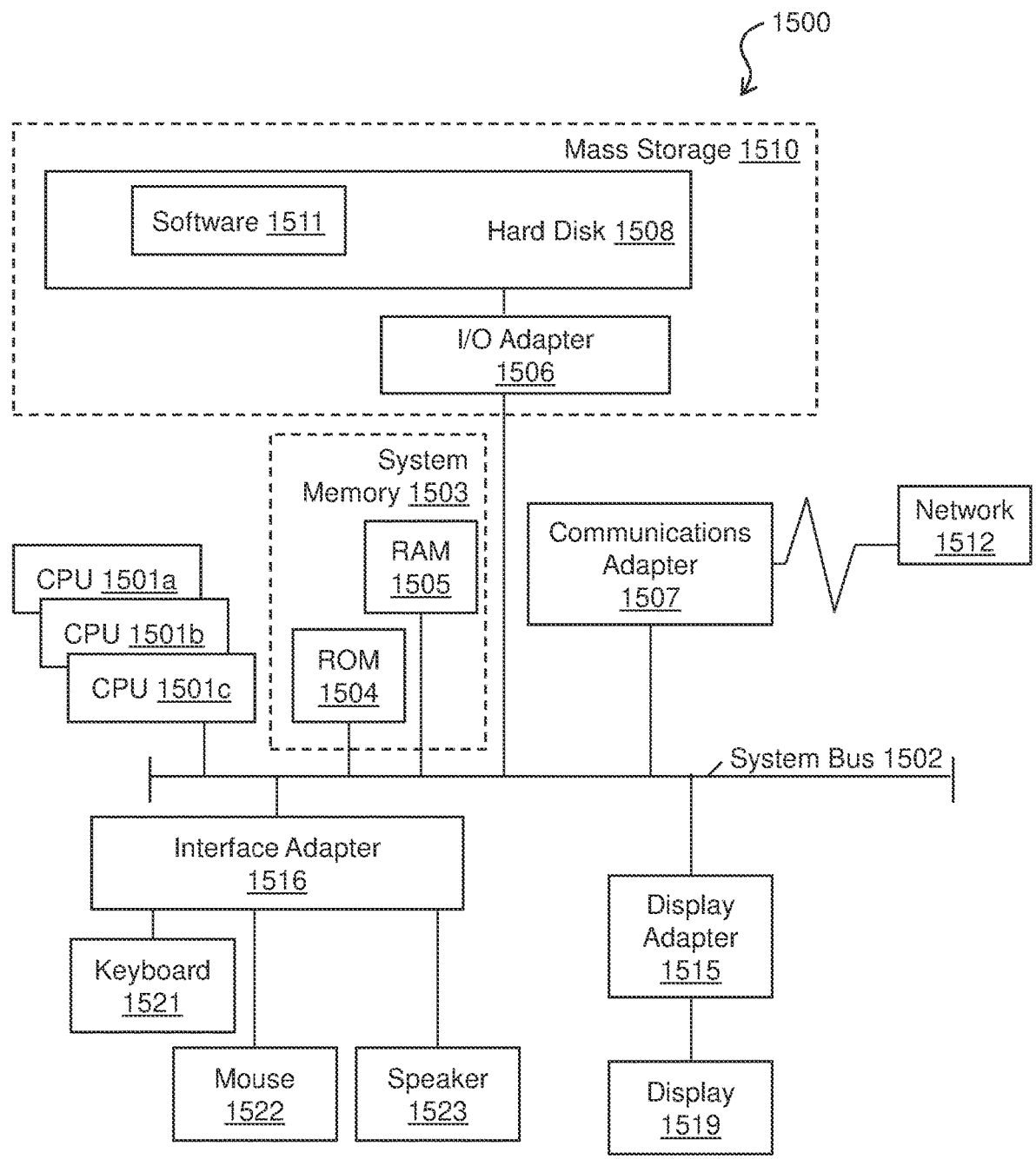
FIG. 6 depicts a computing system according to one or more embodiments of the present invention.

Turning now to FIG. 6, a computer system 1500 is generally shown in accordance with an embodiment. The computer system 1500 can be a computing system the incorporates components of the system 100 of FIG. 1. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501 are further examples of the processor 105 of FIG. 1. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 6.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 1500 includes processing capability in the form of the processors 1501, and storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 6 is not intended to indicate that the computer system 1500 is to include all of the components shown in FIG. 6. Rather, the computer system 1500 can include any appropriate fewer or additional components not illustrated in FIG. 6 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
assigning a first group of one or more units of an instruction pipeline of a processor as a frontend group;
assigning a second group of the one or more units of the instruction pipeline of the processor as a backend group;
performing a frontend logout to transfer one or more trace records from the first group to a trace controller during an in-memory trace of an instruction after the first group completes processing;
performing a backend logout to transfer one or more trace records from the second group to the trace controller during the in-memory trace of the instruction after the second group completes processing;
starting a next instruction in the first group of the instruction pipeline before the backend logout completes; and
fetching and dispatching a subsequent instruction after the next instruction based on completion of the frontend logout of the next instruction and determining that the one or more trace records from the second group are empty.

2. The computer-implemented method of claim 1, further comprising:
blocking the next instruction from starting in the first group of the instruction pipeline until after the frontend logout completes; and
blocking the next instruction from starting in the second group of the instruction pipeline until after the backend logout completes for the instruction.

3. The computer-implemented method of claim 1, further comprising:
suppressing generation of one or more new trace records by at least one of the one or more units of the instruction pipeline based on the trace controller sending a new trace record inhibit signal to the one or more units.

4. The computer-implemented method of claim 3, wherein the suppressing generation of the one or more new trace records is performed to prevent the next instruction from generating one or more new trace records in the first group until after the backend logout completes for the instruction.

5. The computer-implemented method of claim 1, further comprising:
determining an operating mode of the processor based on the instruction being processed; and
enabling or disabling overlapped logout processing of the frontend group and the backend group.

6. The computer-implemented method of claim 1, further comprising:
skipping the frontend logout based on determining the one or more trace records from the first group contain no new values; and
skipping the backend logout based on determining the one or more trace records from the second group contain no new values.

7. A system of a processor, the system comprising:
an instruction pipeline comprising a plurality of units; and
a trace controller comprising circuitry to perform operations comprising:
assigning a first group of one or more units of the instruction pipeline of the processor as a frontend group;
assigning a second group of the one or more units of the instruction pipeline of the processor as a backend group;
performing a frontend logout to transfer one or more trace records from the first group to a trace controller during an in-memory trace of an instruction after the first group completes processing;
performing a backend logout to transfer one or more trace records from the second group to the trace controller during the in-memory trace of the instruction after the second group completes processing;
starting a next instruction in the first group of the instruction pipeline before the backend logout completes; and
suppressing generation of one or more new trace records by at least one of the one or more units of the instruction pipeline based on the trace controller sending a new trace record inhibit signal to the one or more units, wherein the suppressing generation of the one or more new trace records is performed to prevent the next instruction from generating one or more new trace records in the first group until after the backend logout completes for the instruction.

8. The system of claim 7, wherein the trace controller is operable to perform operations comprising:
blocking the next instruction from starting in the first group of the instruction pipeline until after the frontend logout completes; and
blocking the next instruction from starting in the second group of the instruction pipeline until after the backend logout completes for the instruction.

9. The system of claim 7, wherein the trace controller is operable to perform operations comprising:
determining an operating mode of the processor based on the instruction being processed; and
enabling or disabling overlapped logout processing of the frontend group and the backend group.

10. The system of claim 7, wherein the trace controller is operable to perform operations comprising:
skipping the frontend logout based on determining the one or more trace records from the first group contain no new values; and
skipping the backend logout based on determining the one or more trace records from the second group contain no new values.

11. The system of claim 7, wherein the trace controller is operable to perform operations comprising:
fetching and dispatching a subsequent instruction after the next instruction based on completion of the frontend logout of the next instruction and determining that the one or more trace records from the second group are empty.

12. A computer program product comprising a computer readable storage medium having program instructions embodied therewith, the program instructions executable by circuitry of a processor to cause the processor to perform operations comprising:

assigning a first group of one or more units of an instruction pipeline of the processor as a frontend group;
assigning a second group of the one or more units of the instruction pipeline of the processor as a backend group;
performing a frontend logout to transfer one or more trace records from the first group to a trace controller during an in-memory trace of an instruction after the first group completes processing;
performing a backend logout to transfer one or more trace records from the second group to the trace controller during the in-memory trace of the instruction after the second group completes processing;
starting a next instruction in the first group of the instruction pipeline before the backend logout completes; and
fetching and dispatching a subsequent instruction after the next instruction based on completion of the frontend logout of the next instruction and determining that the one or more trace records from the second group are empty.

13. The computer program product of claim 12, wherein the program instructions are executable by the circuitry of the processor to cause the processor to perform operations comprising:
blocking the next instruction from starting in the first group of the instruction pipeline until after the frontend logout completes; and
blocking the next instruction from starting in the second group of the instruction pipeline until after the backend logout completes for the instruction.

14. The computer program product of claim 12, wherein the program instructions are executable by the circuitry of the processor to cause the processor to perform operations comprising:
suppressing generation of one or more new trace records by at least one of the one or more units of the instruction pipeline based on the trace controller sending a new trace record inhibit signal to the one or more units.

15. The computer program product of claim 12, wherein the program instructions are executable by the circuitry of the processor to cause the processor to perform operations comprising:
determining an operating mode of the processor based on the instruction being processed; and
enabling or disabling overlapped logout processing of the frontend group and the backend group.

16. The computer program product of claim 12, wherein the program instructions are executable by the circuitry of the processor to cause the processor to perform operations comprising:
skipping the frontend logout based on determining the one or more trace records from the first group contain no new values; and
skipping the backend logout based on determining the one or more trace records from the second group contain no new values.

17. The computer program product of claim 14, wherein the suppressing generation of the one or more new trace records is performed to prevent the next instruction from generating one or more new trace records in the first group until after the backend logout completes for the instruction.

* * * * *